United States Patent [19]

Lai et al.

[11] 4,309,336

[45] * Jan. 5, 1982

[54] POLYMERIC COMPOSITIONS CONTAINING ANTIOXIDANTS

[75] Inventors: John T. Lai, Broadview Heights, Ohio; Valerie B. Whitehead, Corning, N.Y.

[73] Assignee: The B. F. Goodrich Company, Akron, Ohio

[ * ] Notice: The portion of the term of this patent subsequent to Feb. 26, 1997, has been disclaimed.

[21] Appl. No.: 150,279

[22] Filed: May 15, 1980

[51] Int. Cl.$^3$ .............................................. C08K 5/34
[52] U.S. Cl. ...................... 260/45.8 N; 260/45.8 NT; 260/45.85 S; 260/45.95 F; 260/398.5
[58] Field of Search ................ 260/45.8 NH; 544/354

[56] References Cited

U.S. PATENT DOCUMENTS 4,097,452 6/1978 Mayer et al. ................ 260/45.8 NH
4,190,571 2/1980 Lai et al. ..................... 260/45.8 NH

*Primary Examiner*—John Kight, III
*Assistant Examiner*—R. A. White
*Attorney, Agent, or Firm*—George A. Kap; J. Hughes Powell, Jr.

[57] ABSTRACT

Composition of matter comprising a polymeric material containing xylene-bis(decahydroquinoxalin-2-one) antioxidant, a mixture thereof, or a synergistic mixture thereof with a hindered phenol antioxidant.

9 Claims, No Drawings

POLYMERIC COMPOSITIONS CONTAINING ANTIOXIDANTS

BACKGROUND OF THE INVENTION

Progressive changes in the physical properties of polymeric compositions occur on aging as a result of the combined effects of heat, light, oxygen and ozone. Oxygen and ozone are the agents which are primarily responsible for deterioration of such polymeric compositions and such deterioration is generally referred to as thermal oxidation. It has been shown that an uncured polymer subjected to thermal oxidation first undergoes softening but as the extent of oxidation increases, it gradually becomes harder until a brittle material is finally formed. The tendency toward hardening as aging proceeds, observed in the later stage with an uncured polymer, is observed during the aging of cured polymers, as evidenced by a progressive rise in the modulus.

Antioxidants have been employed to minimize the deteriorating effects of oxidation on polymers. Because of the volatility and relative insolubility of many antioxidants in polymer compositions, only a small portion of the antioxidant added to the polymer system actually remains in the final polymer. It is, therefore, desirable to provide highly efficient, relatively non-fugitive antioxidants which impart a high degree of stability to polymers.

SUMMARY OF THE INVENTION

This invention relates to composition of matter comprising an organic material subject to attack by oxygen and an effective amount of an antioxidant selected from xylene-bis(decahydroquinoxalin-2-one) compounds, hereinafter referred to as "XDQ", mixtures of such XDQ compounds, and synergistic mixtures of XDQ compounds with other antioxidants. Suitable antioxidants are defined by the following structural formula

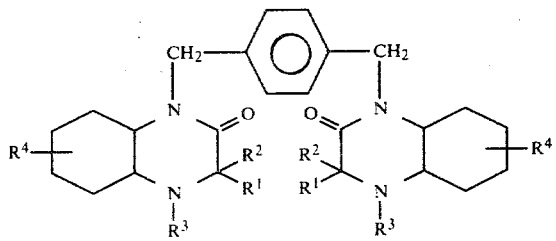

where $R^1$ and $R^2$ are independently selected from hydrogen; alkyl and haloalkyl groups of 1 to 12 carbon atoms; cyanoalkyl, aminoalkyl, and iminoalkyl groups of 2 to 12 carbon atoms; cycloalkyl and hydroxycycloalkyl groups of 4 to 14 carbon atoms; aryl and aralkyl groups of 6 to 14 carbon atoms; $R^1$ and $R^2$ taken together form a cyclic structure selected from cycloalkyl and cycloalkenylene groups containing 4 to 14 carbon atoms; $R^3$ groups are independently selected from hydrogen, alkyl and hydroxyalkyl groups of 1 to 12 carbon atoms, cyanoalkyl groups of 2 to 12 carbon atoms, aminoalkyl groups of 1 to 12 carbon atoms, alkenyl groups of 2 to 14 carbon atoms, and aryl and aralkyl groups of 6 to 14 carbon atoms. $R^4$ groups are independently selected from hydrogen, alkyl and haloalkyl groups of 1 to 12 carbon atoms, cyanoalkyl groups of 2 to 12 carbon atoms, aminoalkyl groups of 2 to 12 carbon atoms, alkenyl groups of 2 to 14 carbon atoms, and aryl and aralkyl groups of 6 to 14 carbon atoms.

DETAILED DESCRIPTION OF THE INVENTION

The XDQ compounds are useful in providing oxidative protection for organic materials subject to oxygen attack. Such organic materials can be fatty oils and fats, waxes, triglycerides, and the like, but more typically are olefinic polymers having molecular weight from about 1000 to about 1,000,000 or more. These olefinic polymers can be saturated polymers or copolymers such as the polyesters, polyvinyl halides, polyvinyl alcohols, polymonoolefins, and the like; or dienic polymers or copolymers such as the polybutadienes, polyisoprenes, styrene-butadiene polymers, butadiene-acrylonitrile polymers, and the like. Alternately, the olefinic polymers can be copolymers of mono- and diolefinic monomers such as the ethylene-propylene-diene polymers wherein the diene can be 1,4-hexadiene, dicyclopentadiene, ethylidene norbornene, and the like.

XDQ compounds have particular utility in providing oxidative protection for polymonoolefin polymers and copolymers, especially homopolymers and copolymers of α-monoolefins. Examples of such are polymers of α-monoolefin monomers such as ethylene, propylene, isobutylene, 1-butene, 1-pentene, 1-hexene, 4-methyl-1-pentene, and the like. Polymers of ethylene, propylene, isobutylene, 1-butene, mixtures thereof, and mixtures with diene monomers are the most common. Such polymers typically have molecular weights ranging from about 3000 to about 20,000 or more.

Useful XDQ compounds which have antioxidant property in various polymers, especially polymonoolefins, are the following:

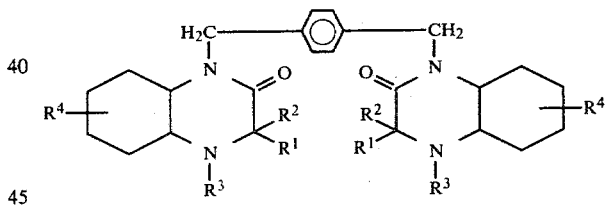

where $R^1$ and $R^2$ are independently selected from hydrogen, alkyl or alkenyl groups containing 1 to 12 carbon atoms, cyanoalkyl of 2 to 12 carbon atoms, aminoalkyl or iminoalkyl of 2 to 12 carbon atoms, cycloalkyl and hydroxycycloalkyl of 4 to 14 carbon atoms, aryl and aralkyl groups of 6 to 14 carbon atoms; $R^1$ and $R^2$ taken together form a cyclic structure selected from cycloalkyl and cycloalkenylene groups containing 4 to 14 carbon atoms; $R^3$ groups are independently selected from hydrogen, alkyl and hydroxyalkyl groups of 1 to 12 carbon atoms, cyanoalkyl groups of 2 to 12 carbon atoms, aminoalkyl groups of 1 to 12 carbon atoms, alkenyl groups of 2 to 14 carbon atoms, and aryl and aralkyl groups of 6 to 14 carbon atoms. $R^4$ groups are independently selected from alkyl and haloalkyl groups of 1 to 12 carbon atoms, cyanoalkyl groups of 2 to 12 carbon atoms, aminoalkyl groups of 2 to 12 carbon atoms, alkenyl groups of 2 to 14 carbon atoms, and aryl and aralkyl groups of 6 to 14 carbon atoms. In a preferred embodiment, $R^1$ and $R^2$ are independently selected from alkyl groups of 1 to 8 carbon atoms, phenyl groups, or $R^1$ and $R^2$ in combination represent a cycloalkyl group containing 4 to 14 carbon atoms of which 4 to 7 carbon atoms are cyclized.

The antioxidants of this invention are prepared by adding to a reaction vessel a dialkyl- or polyalkylenedecahydroquinoxalin-2-one, referred to as DQ hereinafter, a α,α'-dihalo-p-xylene in a suitable solvent, and a base such as sodium hydride. The contents of the reaction vessel are heated to a temperature of about 90° to 100° C. overnight following which, the solvent is stripped leaving a solid residue of the antioxidant product and a sodium halide salt. The residue is initially washed with water to remove the halide salt and any residual sodium hydride and then with heptane or hexane to dissolve any remaining impurities. The product is recovered in powder form. The procedure can differ substantially from the one described above. U.S. Pat. No. 4,167,512 to John Lai, the same inventor as herein, is incorporated by reference for its disclosure of various XDQ compounds and processes for their preparation.

The antioxidants described herein can be used alone or in combination with other antioxidants. When used alone, these antioxidants equal or surpass the known antioxidants in their ability to protect polymeric materials from thermal oxidation. In combination with the known antioxidants, they produce synergistic results in terms of antioxidant function. Any of the phenolic antioxidants can be used with the XDQ antioxidants described herein. The antioxidants are also used in combination with carbon black and occasionally, with ultraviolet absorbers. The most effective of the other type of antioxidants are hindered phenols, methylenebis-, 1,1-ethylenebis-, or isopropylidenebis (alkylphenols, and thiobisphenols or thiobisamines. Examples of hindered phenolic antioxidants include di-n-octadecyl-d-(3,5-di-t-butyl-4-hydroxy-benzyl malonate, 2,6-di-t-butyl-p-cresol, 4,4'-methylene-bis(3,5-di-t-butylphenol, 2,5-di-t-butylhydroquinone, 4,4'-thiobis-(2-t-butyl-5-methyl-phenol, 1,1,3-tris(3,5-dimethyl-4-hydroxyphenyl)-propane, 1,4-di(3,5-di-t-butyl-hydroxybenzyl)-2,3,5,6-tetramethylbenzene, 2,4-bis-(n-octylthio)-6-(3,5-di-t-butyl-4-hydroxyaniline)-1,3,5-triazine, 2,3-bis-(3,5-di-t-butyl-4-hydroxyphenoxy)-6-(n-octylthio)-1,3,5-triazine, n-octadecyl-3-(3,5-di-t-butyl-4-hydroxyphenyl)-propionate, di-n-octadecyl 3,5-di-t-butyl-4-hydroxybenzylphosphonate, tris-(3,5-di-t-butyl-4-hydroxybenzyl)isocyanurate, 2,2'-methylenebis[6-(2-methylcyclohexyl)p-cresol], 4,4'-ethylidenedi-o-cresol, 4,4'-methylenebis(2,6-dialkylphenol), and 2,6-di-tertbutyl-p-cresol. Examples of other antioxidants include N,N'-di-2-naphthyl-p-phenylenediamine, salts or amides of 3,3'-thiodipropionic acid, bis(dimethylthiocarbamoyl)disulfide, 1,1'-thiodi-2-naphthol, 1,1'-thiobis[N-phenyl-2-naphthylamine], N,N'-(iminodiethylene)bisoctadecanamide, as well as those of aminoacryl series, for instance, of aniline and naphthylamine derivatives as well as their heterocyclic derivatives. U.S. Pat. No. 3,998,784 is hereby incorporated by reference for its disclosure of the various antioxidants.

An effective amount of the XDQ antioxidant is used in conjunction with a polymeric material to obtain at least a partial protection from thermal oxidation. This amount will vary with the type of polymeric material employed, the particular XDQ antioxidant that is selected, whether it is used as a primary or a secondary antioxidant, the type of primary antioxidant used and amount thereof, application of the resulting polymeric material, etc. More specifically, amount of XDQ antioxidants used can vary from as little as about 0.001 to about 10 parts per 100 parts of the polymeric material. In a preferred embodiment, amount of these antioxidants can vary from about 0.01 to about 5 parts, preferably up to about 1 part per 100 parts of the polymeric material. Amount of the other type of antioxidant that can be used in combination with the XDQ antioxidants can vary from 0.01 to 5 parts by weight, preferably 0.05 to 1 part per 100 parts of the polymeric material.

The XDQ compounds and other antioxidants can be incorporated into the polymeric material by any of the known techniques for compounding additives with a polymer. For example, antioxidant(s) and a polymer can be compounded in an internal mixer. Alternatively, an antioxidant(s) can be added as a solution or slurry in a suitable solvent or dispersant, for instance in an inert organic solvent such as methanol, ethanol or acetone to powdered polymer and the whole mixed intimately in a mixer and the solvent subsequently removed. As a further alternative, antioxidant(s) can be added to the polymer during the preparation of the latter, for instance, at the latex stage of polymer production, to provide pre-stabilized polymer material.

Optionally, the composition of this invention can contain one or more additives, especially those used in polymer formulations, such as antioxidants of the phenol or amine type, as noted earlier, U.V. absorbers and light protectants, phosphite stabilizers, peroxide decomposers, polyamide stabilizers, basic co-stabilizers, nucleation agents, plasticizers, lubricants, emulsifiers, antistatic agents, flame-protectants, pigments, carbon black, asbestos, glass-fibres, kaolin and talc.

The following examples illustrate the invention described herein with emphasis on the novel aspects thereof. Contents of these examples are not to be construed as limiting in any way the scope of the invention disclosed herein.

EXAMPLE 1

This example illustrates preparation of trans-α,α'-para-xylene-bis-(3,3-pentamethylene decahydroquinoxalin-2-one) (XDQ) by reacting one equivalent of 3,3-pentamethylene-decahydroxalin-2-one (DQ) with half equivalent of α,α'-dichloroxylene in presence of about one equivalent of sodium hydride, as depicted by the following formulas:

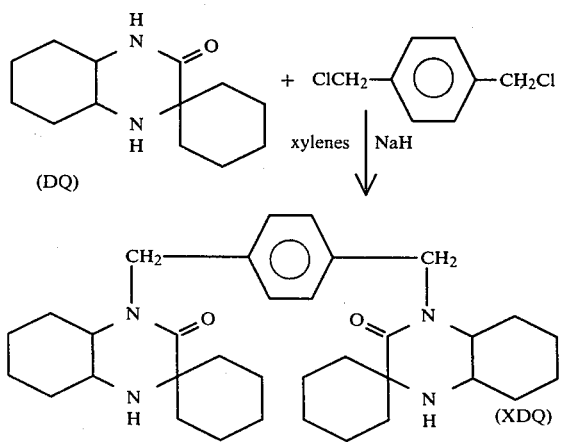

In the preparation of the XDQ antioxidant, 0.022 moles of sodium hydride was washed once with 20 mls of mixed xylenes, then placed in 40 mls of fresh xylenes in a 150 ml vessel provided with stirring means, condenser, thermometer, and a heating mantle. All of 0.02 mole of DQ was added to the vessel and heated to reflux at 133° C. under argon. A total of 0.01 mole of the dichloroxylene was added to the reaction vessel in small increments over a period of about one-half hour and the reaction mixture was refluxed at 138° C. overnight under a blanket of argon. Contents of the reaction mixture were cooled and 15 mls of water was added with agitation. After filtration, 3.1 grams of light green solid product was recovered. The filtrate was extracted with 25 mls of toluene, concentrated and filter cake was dried whereby additional 1.9 grams of product was obtained.

Numerous other antioxidant compounds A to K were prepared falling within the ambit of suitable antioxidants defined herein, including the following:

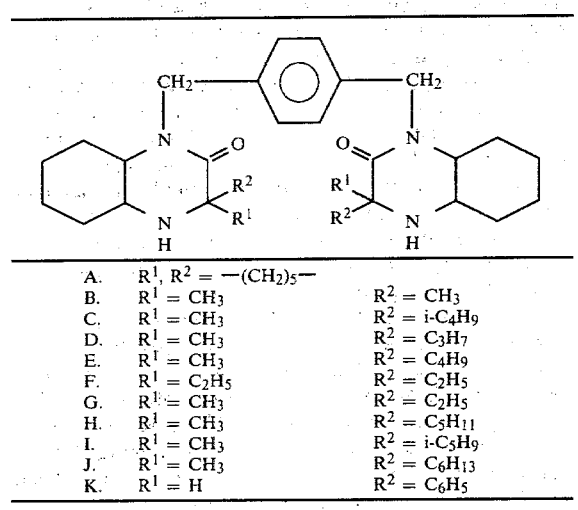

| | | |
|---|---|---|
| A. | $R^1, R^2 = -(CH_2)_5-$ | |
| B. | $R^1 = CH_3$ | $R^2 = CH_3$ |
| C. | $R^1 = CH_3$ | $R^2 = i-C_4H_9$ |
| D. | $R^1 = CH_3$ | $R^2 = C_3H_7$ |
| E. | $R^1 = CH_3$ | $R^2 = C_4H_9$ |
| F. | $R^1 = C_2H_5$ | $R^2 = C_2H_5$ |
| G. | $R^1 = CH_3$ | $R^2 = C_2H_5$ |
| H. | $R^1 = CH_3$ | $R^2 = C_5H_{11}$ |
| I. | $R^1 = CH_3$ | $R^2 = i-C_5H_9$ |
| J. | $R^1 = CH_3$ | $R^2 = C_6H_{13}$ |
| K. | $R^1 = H$ | $R^2 = C_6H_5$ |

EXAMPLE 2

Certain of the antioxidants were evaluated alone and in conjunction with another antioxidant, Good-rite 3114 (GR-3114) which, chemically, is tris(3,5-di-t-butyl-4-hydroxybenzyl)isocyanurate. The thermal oxidation tests were carried out by incorporating the antioxidants into Profax 6501 polypropylene at specific concentrations. Plaques 1"×1"×0.01" were made from stabilized polypropylene and aged in triplicate in high temperature ovens at 125° C. and 150° C. until they were totally degraded. Results of the tests are set forth in Table I, below, where amounts are given in parts by weight per 100 parts of polymer and where designation "AO" is to be read as "antioxidant":

TABLE I

| | Days to Failure | |
|---|---|---|
| Formulation | 125° C. | 150° C. |
| Polypropylene | 1⅜ | 1 |
| 0.1 GR-3114 | 25 | 2 |
| 0.1 AO-B | 19¼ | 3¼ |
| 0.1 AO-J | 24¼ | 3 |
| 0.1 AO-A | 30 | 3 |
| 0.05 GR-3114 + 0.05 AO-B | 47⅔ | 3⅔ |
| 0.05 GR-3114 + 0.05 AO-J | 41¼ | 3¼ |
| 0.05 GR-3114 + 0.05 AO-A | 55⅔ | 5 |

It should be apparent that antioxidants A, B, and J exhibited primary and secondary antioxidant properties. Synergism of antioxidants A, B and J is very apparent and is of a great magnitude, especially for the tests carried out at 125° C. As shown above, the effect of the combination of the antioxidants generally doubled the duration to failure in the 125° C. tests. For purposes herein, synergism is defined as an effect of a combination of elements that is greater than effect of its constituent parts based on a unit of weight. Synergism is illustrated by the results of the above tests wherein 0.1 phr of GR-3114 and antioxidant B each provided protection from thermal oxidation at 125° C. as measured in days to failure of 25 and 19⅓ days, respectively, whereas the combination of 0.05 phr of each resulted in days to failure of an unexpected 47⅔ days.

EXAMPLE 3

Other antioxidants were evaluated in conjunction with the XDQ antioxidants disclosed herein. Ethyl-330 (E-330) is an antioxidant identified as 1,3,5-trimethyl-2,4,6tris-(3,5-di-t-butyl-4-hydroxybenzyl)benzene; Cyasorb 531 (Cy-531) antioxidant is p-octyloxy-o-hydroxy benzophenone; Good-rite 3125 (GR-3125) antioxidant is a chemically pure, tri-functional hindered phenol in finely divided crystalline form; and DSTDP is antioxidant which stands for distearylthiodipropionate. Varying concentrations of antioxidant B were incorporated into polypropylene together with the other antioxidants and the thus stabilized polypropylene was formed into plaques and aged in triplicate, as previously described. Results of these tests are set forth in Table II below, where amounts are given in parts per 100 parts of polypropylene:

TABLE II

| | Days to Failure | |
|---|---|---|
| Formulation | 125° C. | 150° C. |
| 0.25 GR-3114 + 0.125 AO-B | 187½ | 4⅔ |
| 0.25 GR-3114 + 0.25 AO-B | 273⅔ | 4⅔ |
| 0.25 GR-3114 + 0.50 AO-B | 329⅔ | 5⅔ |
| 0.25 GR-3114 | 74 | 2 |
| 0.1 GR-3114 + 0.1 AO-B | 66⅓ | 4¼ |
| 0.1 GR-3114 + 0.1 AO-A | 92 | 5⅔ |
| 0.1 GR-3114 + 0.1 AO-J | 83 | 8⅔ |
| 0.1 GR-3114 | 32⅔ | 1⅔ |
| 0.25 DSTDP + 0.1 AO-B | 25 | 1⅔ |
| 0.25 DSTDP + 0.1 AO-A | 34 | 2¼ |
| 0.25 DSTDP + 0.1 AO-J | 28⅔ | 1⅔ |
| 0.25 DSTDP | 8⅔ | 1 |
| 0.1 AO-B | 16¼ | 1⅔ |
| 0.1 AO-A | 39 | 3 |
| 0.1 AO-J | 28¼ | 3⅔ |
| 0.1 E-330 + 0.50 AO-B | 316⅔ | 10⅔ |
| 0.1 E-330 | 97 | 17 |

EXAMPLE 4

Another series of experiments were conducted to test a number of antioxidants in polypropylene at 150° C., as in Example 1. Results are given in Table III, below:

| Antioxidant | Amount phr | 32 Days to Failure at 150° C. |
|---|---|---|
| B | 0.25 | 6⅔ |
| B | 0.5 | 10¼ |
| C | 0.25 | 7⅔ |
| C | 0.5 | 15⅔ |
| D | 0.25 | 4⅔ |
| D | 0.5 | 13⅔ |
| E | 0.25 | 11¼ |
| E | 0.5 | 21 |
| A | 0.25 | 29 |
| A | 0.5 | NA |
| F | 0.25 | 9¼ |

| Antioxidant | Amount phr | 32 Days to Failure at 150° C. |
|---|---|---|
| F | 0.5 | NA |
| G | 0.25 | 10 |
| G | 0.5 | 17 |
| H | 0.25 | 13⅔ |
| H | 0.5 | 28 |
| I | 0.25 | 17 |
| I | 0.5 | 34 |
| Cy-531 | 0.25 | 1 |
| Cy-531 | 0.5 | 1 |
| DSTDP | 0.25 | 1 |
| DSTDP | 0.5 | 1⅔ |
| GR-3114 | 0.25 | 4 |
| GR-3114 | 0.5 | 10 |

On the basis of the above results, it should be apparent that the tested antioxidants of this invention are as good as or superior to the known antioxidants.

The antioxidants of this invention evaluated herein have been shown to provide protection from thermal oxidation. A number of other related compounds were evaluated but were found to be ineffective as antioxidants. These include para-xylidene piperizone, which has the following structure:

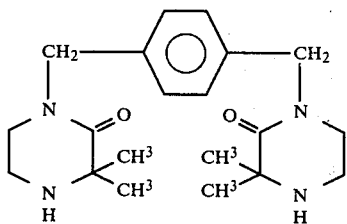

This is also true of α,α'-xylene-bis-1-(piperazine-2-one), which has the following structure:

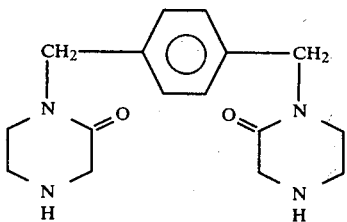

We claim:

1. Composition of matter comprising an organic material subject to attack by oxygen and an effective amount of antioxidant composition comprising an organic compound defined by the following structural formula:

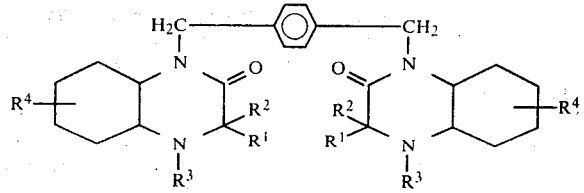

where $R^1$ and $R^2$ are independently selected from hydrogen; alkyl and haloalkyl groups of 1 to 12 carbon atoms; cyanoalkyl, aminoalkyl, and iminoalkyl groups of 2 to 12 carbon atoms; cycloalkyl and hydroxycycloalkyl groups of 4 to 14 carbon atoms; aryl and aralkyl groups of 6 to 14 carbon atoms; $R^1$ and $R^2$ taken together form a cyclic structure selected from cycloalkyl and cycloalkenylene groups containing 4 to 14 carbon atoms; $R^3$ groups are independently selected from hydrogen, alkyl and hydroxyalkyl groups of 1 to 12 carbon atoms, cyanoalkyl groups of 2 to 12 carbon atoms, aminoalkyl groups of 1 to 12 carbon atoms, alkenyl groups of 2 to 14 carbon atoms, and aryl and aralkyl groups of 6 to 14 carbon atoms; and $R^4$ groups are independently selected from hydrogen, alkyl and haloalkyl groups of 1 to 12 carbon atoms, cyanoalkyl groups of 2 to 12 carbon atoms, aminoalkyl groups of 2 to 12 carbon atoms, alkenyl groups of 2 to 14 carbon atoms, and aryl and aralkyl groups of 6 to 14 carbon atoms.

2. Composition of claim 1 wherein amount of said organic compound is 0.01 to 10 parts per 100 parts of said organic material, and wherein $R^1$ and $R^2$ are independently selected from alkyl groups of 1 to 8 carbon atoms, phenyl group, or wherein $R^1$ and $R^2$ in combination represent a cycloalkyl group containing 4 to 14 carbon atoms of which 4 to 7 carbon atoms are cyclized; and $R^3$ and $R^4$ groups are hydrogens.

3. Composition of claim 2 wherein said organic material is selected from polymonoolefins and dienic polymers.

4. Composition of claim 2 wherein amount of said organic compound is 0.05 to 5 parts per 100 parts of said organic material which is selected from olefinic polymers and copolymers.

5. Composition of claim 4 wherein said organic material is selected from homopolymers and copolymers of α-monoolefins and diene monomers.

6. Composition of claim 5 wherein said organic material is selected from homopolymers and copolymers of ethylene, propylene, isobutylene, 1-butene, 1-pentene, 1-hexene, 4-methyl-1-pentene, and diene monomers.

7. Composition of claim 4 wherein said antioxidant composition comprises said organic compound and at least one other antioxidant compound selected from hindered phenols, the combined amount of said organic compound and said other antioxidant compound being sufficient to produce a synergistic antioxidant effect.

8. Composition of claim 7 wherein amount of said other antioxidant compound is 0.01 to 5 parts per 100 parts of said organic material.

9. Composition of claim 7 wherein said organic material is selected from homopolymers and copolymers of α-monoolefins, and diene monomers.

* * * * *